United States Patent
Kim et al.

(10) Patent No.: US 10,486,773 B2
(45) Date of Patent: Nov. 26, 2019

(54) CAVITATOR SYSTEM FOR SUPPRESSING CAVITY BUOYANCY EFFECT AND METHOD THEREOF

(71) Applicant: AGENCY FOR DEFENSE DEVELOPMENT, Daejeon (KR)

(72) Inventors: Minjae Kim, Daejeon (KR); Youngrae Jung, Daejeon (KR); Kurnchul Lee, Daejeon (KR)

(73) Assignee: AGENCY FOR DEFENSE DEVELOPMENT (KR)

(*) Notice: Subject to any disclaimer, the term of this patent is extended or adjusted under 35 U.S.C. 154(b) by 0 days.

(21) Appl. No.: 16/132,947

(22) Filed: Sep. 17, 2018

(65) Prior Publication Data
US 2019/0322335 A1 Oct. 24, 2019

(30) Foreign Application Priority Data
Apr. 20, 2018 (KR) .................. 10-2018-0046251

(51) Int. Cl.
*B63B 1/38* (2006.01)
*B63B 1/34* (2006.01)

(52) U.S. Cl.
CPC .............. *B63B 1/38* (2013.01); *B63B 1/34* (2013.01); *B63B 2001/382* (2013.01); *B63B 2001/387* (2013.01)

(58) Field of Classification Search
CPC ..... B63B 1/00; B63B 1/34; B63B 1/38; F42B 19/00; F42B 10/34; F42B 10/38; F42B 10/46
USPC ....................................... 114/67 A
See application file for complete search history.

(56) References Cited

FOREIGN PATENT DOCUMENTS

| | | |
|---|---|---|
| JP | 2001-021296 A | 1/2001 |
| JP | 03291542 B2 | 6/2002 |
| KR | 10-1195773 B1 | 11/2012 |
| KR | 10-1337298 B1 | 12/2013 |
| KR | 10-1570322 B1 | 11/2015 |
| KR | 10-1597632 B1 | 2/2016 |
| WO | WO-2016204347 A1 * 12/2016 | .............. B63B 1/38 |

(Continued)

OTHER PUBLICATIONS

Office Action dated May 27, 2019 in corresponding Korean Patent Application No. 10-2018-0046251.
(Continued)

*Primary Examiner* — Lars A Olson
(74) *Attorney, Agent, or Firm* — Ostrolenk Faber LLP (57) ABSTRACT

A cavitator system for suppressing a cavity buoyancy effect and a control method thereof are provided. The cavitator system for suppressing a cavity buoyancy effect includes a cavity generating unit disposed at a front portion of an underwater vehicle and generating super-cavity, a pneumatic hose transferring compressed air stored in a compressed air tank to the underwater vehicle, a ventilation module positioned at a tail portion of the underwater vehicle and including at least one hole ventilating compressed air transferred through the pneumatic hose vertically downwards, and a controller sensing rise of a cavity tail portion and a change in posture of the underwater vehicle when a super-cavity is generated and ventilating compressed air through the ventilation module such that a vertically downward lift is generated at the cavity tail portion.

9 Claims, 6 Drawing Sheets

(56) References Cited

FOREIGN PATENT DOCUMENTS

| WO | WO-2016204348 A1 | * | 12/2016 | ............... | A63B 1/34 |
| WO | WO-2016204349 A1 | * | 12/2016 | ............... | A63B 1/38 |

OTHER PUBLICATIONS

Notice of Allowance dated Sep. 3, 2019 in corresponding Korean Patent Application No. Oct. 2018-0046251.

* cited by examiner

[Scale 2:1]

| ITEM | BEFORE VENTILATION | | AFTER VENTILATION | |
|---|---|---|---|---|
| | CAVITY THICKNESS | CAVITY LENGTH | CAVITY THICKNESS | CAVITY LENGTH |
| 5 hole | 2.80 | 14.14 | 2.95 | 16.56 |
| slit | 2.78 | 14.27 | 3.06 | 17.41 |

CAVITATOR SYSTEM FOR SUPPRESSING CAVITY BUOYANCY EFFECT AND METHOD THEREOF

CROSS-REFERENCE TO RELATED APPLICATION

Pursuant to 35 U.S.C. § 119(a), this application claims the benefit of earlier filing date and right of priority to Korean Application No. 10-2018-0046251, filed on Apr. 20, 2018, the contents of which is incorporated by reference herein in its entirety.

BACKGROUND OF THE INVENTION

1. Field of the Invention

The present disclosure relates to a cavitator system for supporting a cavity buoyancy effect and a method thereof.

2. Background of the Invention

In the case of an underwater vehicle, most of a traveling drag is generated by a friction drag based on contact with water, and the underwater vehicle is subjected to a frictional resistance about 800 times greater than air due to a difference in density between air and water. Also, in order to increase the speed of the underwater vehicle twice underwater requires eight times the projectile energy corresponding to the cube of the speed, and thus, there is a significant difficulty in increasing the speed of the underwater vehicle.

A supercavitation technology has been developed to overcome the speed limit of underwater vehicles underwater. It is a technology to remarkably reduce a frictional drag by completely covering an underwater vehicle with a cavity to prevent the underwater vehicle from coming into contact with seawater.

In order to realize such the supercavitation technology, it is important to create a super cavity which may completely cover the underwater vehicle. In general, a cavity generator, called a cavitator, is attached to the nose of an underwater vehicle to create a cavity. A cavity generated by the cavitator is gradually increased as a traveling speed of the underwater vehicle increases, and when the traveling speed reaches a predetermined speed, the cavity completely covers the underwater vehicle.

Meanwhile, at an initial low speed section of the underwater vehicle, a buoyancy effect of the cavity due to the difference in density between the cavity and water causes a cavity tail portion to be lifted to be bent a direction opposite to gravity. In this case, the cavity tail portion cannot symmetrically cover the vehicle body, generating an asymmetric force in the body, which makes it difficult to control the posture of the underwater vehicle.

In addition, when the underwater vehicle is in a super-cavity state, the other portion than the cavitator is covered with the cavity, unlike a general underwater vehicle, losing buoyancy based on contact with water. In this case, a lift may be generated by adjusting an angle of attack of the cavitator at a front end of the underwater vehicle. However, since the lift may not be generated at the tail portion of the underwater vehicle, the lift is generated through a method such as a control fin or thrust vector control, thereby performing posture control. However, in the case of using the control fin or thrust vector control, a complicated actuator device is included inside the vehicle, which complicates the system and requires a highly precise control system.

SUMMARY OF THE INVENTION

Therefore, an aspect of the detailed description is to provide a cavitator system implemented to suppress a cavity buoyancy effect without using an additional device to allow a super-cavity underwater vehicle to stably travel (or move), and a control method thereof.

Another aspect of the detailed description is to provide a cavitator system for suppressing a cavity buoyancy effect, which is implemented to generate a lift at a cavity tail portion at the time of generating a super-cavity even without a control fin or thrust vector control to thus allow an underwater vehicle to be stably controlled in posture, and a control method thereof.

To achieve these and other advantages and in accordance with the purpose of this specification, as embodied and broadly described herein, a cavitator system for suppressing a cavity buoyancy effect includes: a cavity generating unit disposed at a front portion of an underwater vehicle and generating super-cavity; a pneumatic hose transferring compressed air stored in a compressed air tank to the underwater vehicle; a ventilation module positioned at a tail portion of the underwater vehicle and including at least one hole ventilating compressed air transferred through the pneumatic hose vertically downwards; and a controller sensing rise of a cavity tail portion and a change in posture of the underwater vehicle when a super-cavity is generated and ventilating compressed air through the ventilation module such that a vertically downward lift is generated at the cavity tail portion.

The controller may monitor a state of the cavity tail portion according to ventilating of the compressed air, and determine whether to additionally ventilation compressed air to adjust a posture of the super-cavity underwater vehicle.

The ventilation module may include: a first ventilation module disposed at a position spaced apart from the cavity generating unit by a predetermined distance; and a second ventilation module spaced apart from the first ventilation module by a predetermined distance.

The controller may separately control ventilating and a ventilation rate of the first ventilation module and the second ventilation module according to the amount of compressed air to be ventilated.

The controller may calculate a numerical value of a lift to be generated at the cavity tail portion according to the degree of rise of the cavity tail portion, and determine a ventilation position and a ventilation rate at the ventilation module on the basis of the calculated numerical value of the lift.

The ventilation module may include a plurality of hole ventilation ports and one or more slit type ventilation ports.

The plurality of hole ventilation ports may have a structure in which the other remaining hole ventilation ports are radially disposed centered on one hole ventilation port and one or more slit type ventilation ports are disposed in the vicinity of the hole ventilation ports.

To achieve these and other advantages and in accordance with the purpose of this specification, as embodied and broadly described herein, an operation method of a cavitator system includes: sensing rise of a cavity tail portion when a super-cavity is generated in an underwater vehicle; calculating a ventilation amount of compressed air for generating a vertically upward lift at the cavity tail portion; ventilating compressed air vertically downwards through one or more holes disposed at a tail portion of the underwater vehicle on the basis of the calculated ventilation amount; and monitoring a state of the cavity tail portion according to the ventilation result.

The operation method may further include: determining whether to additionally ventilation compressed air to adjust a posture of the super-cavity underwater vehicle according to the monitoring.

As described above, according to the cavitator system which suppresses a cavity buoyancy effect and the control method thereof according to the embodiment of the present disclosure, it is possible to suppress rise due to the buoyancy effect of the cavity and to improve the thickness and length of the cavity to reduce or eliminate an asymmetric force acting on the underwater vehicle, thereby stably controlling the posture of the super cavitation underwater vehicle. Accordingly, the super-cavity underwater vehicle may stably travel.

In addition, according to the cavitator system for suppressing a cavity buoyancy effect and the control method thereof according to the embodiment of the present disclosure, it is possible to control the posture of the tail portion of the underwater vehicle, without a control fin or thrust vector control, in a super-cavity state, using a vertical upward lift generated by a principle of action/reaction, by ventilating air vertically downwards from the tail portion of the underwater vehicle.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a cavitator system for suppressing a cavity buoyancy effect according to an embodiment of the present disclosure and a control method thereof will be described in detail with reference to the accompanying drawings.

The present disclosure may be modified variably and may have various embodiments, particular examples of which will be illustrated in drawings and described in detail. However, it is to be understood that the present disclosure is to not limited to a specific disclosed form, but includes all modifications, equivalents, and substitutions without departing from the scope and spirit of the present disclosure.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Other expressions describing a relationship between components, that is, "between", "directly between", "neighboring to", "directly neighboring to" and the like, should be similarly interpreted.

Terms used in the present specification are used only in order to describe specific exemplary embodiments rather than limiting the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms have the same meaning as those that are understood by those skilled in the art to which the present disclosure pertains. It must be understood that the terms defined by the dictionary are identical with the meanings within the context of the related art, and they should not be ideally or excessively formally defined unless the context clearly dictates otherwise.

Hereinafter, preferred embodiments of the present disclosure will be described in detail with reference to the accompanying drawings. In describing the present disclosure, in order to facilitate overall understanding of the present disclosure, the same reference numerals indicate the same members throughout the accompanying drawings and redundant descriptions of the same components will be omitted.

Figure 1:
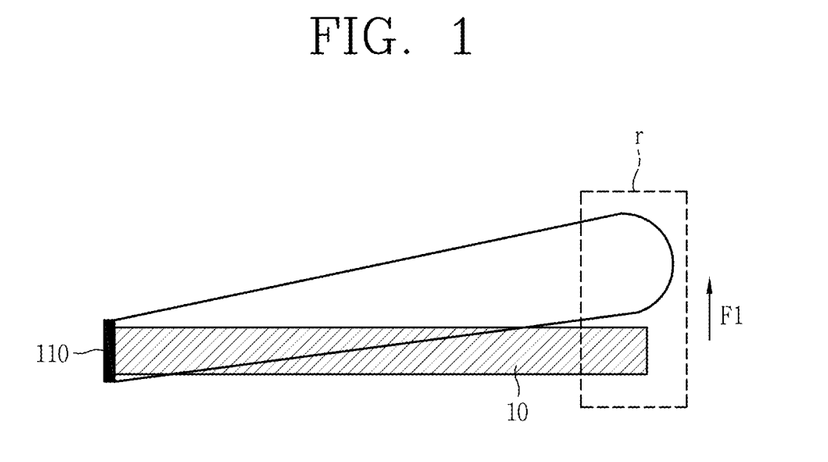
FIG. 1 is a view illustrating a cavity buoyancy effect generated according to generation of a super-cavity.

FIG. 1 is a view illustrating a cavity buoyancy effect that occurs in a tail portion of an underwater vehicle 10 according to generation of a super-cavity. As illustrated in FIG. 1, when a cavity is generated according to an operation of a cavity generating unit 110 disposed at a front portion of the underwater vehicle 10, a cavity tail portion r initially rises due to a buoyancy effect. In this case, it is difficult to control the posture of the super-cavity underwater vehicle 10, and an asymmetric force is generated as a portion of the underwater vehicle 10 not within the cavity is exposed to (be in contact with) water.

Thus, the present disclosure proposes a method for suppressing the buoyancy effect that occurs in the cavity tail portion r. More specifically, the present disclosure proposes a method of reducing or eliminating a water-contact portion of a body of the underwater vehicle 10 by disposing an air ventilation port in the tail portion of the body of the underwater vehicle 10 and ventilating air vertically downwards through the air ventilation port to suppress rise of the cavity, without using a control fin or thrust vector control.

Figure 2:
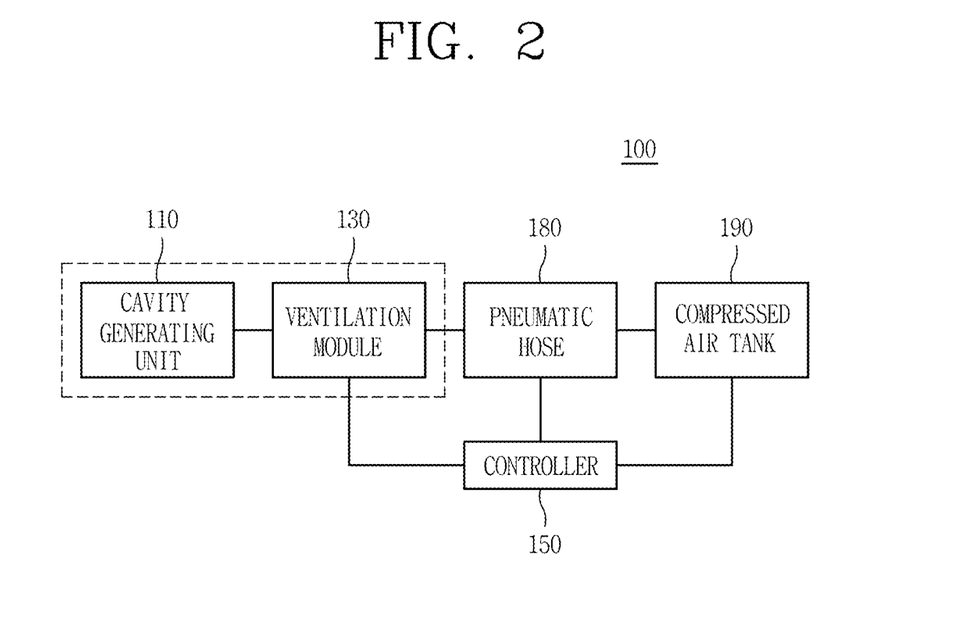
FIG. 2 is a block diagram illustrating a specific configuration of a cavitator system for suppressing a cavity buoyancy effect according to an embodiment of the present disclosure.

Hereinafter, a detailed configuration will be described with reference to a block diagram of the cavitator system 100 in which the cavity buoyancy effect is suppressed according to an embodiment of the present disclosure illustrated in FIG. 2. As illustrated in FIG. 2, the cavitator system 100 according to the present disclosure has a structure in which an underwater vehicle having a cavity generating unit 110 and a ventilation module 130 is connected to a pneumatic hose 180, a compressed air tank 190, and a controller 150.

The cavity generating unit 110 is mounted at a front portion of the underwater vehicle, and causes the underwater vehicle to be in a super-cavity state. Here, the cavity generating unit 110 may be a cavitator.

The ventilation module 130 is located at the tail portion of the underwater vehicle and includes one or more holes through which compressed air delivered through the pneumatic hose 180 is ventilated vertically downwards. Whether to ventilation compressed air from the ventilation module 130, a ventilation position, a ventilation amount, and a ventilation rate are controlled by the controller 150. Further, a plurality of ventilation modules 130 may be provided, and in this case, the ventilation modules 130 may be spaced apart from each other at a predetermined distance for precise posture control.

The pneumatic hose 180 transfers compressed air stored in the compressed air tank 190 to the underwater vehicle. Specifically, one end of the pneumatic hose 180 is connected to the tail portion of the underwater vehicle, and the other end thereof is connected to the compressed air tank 190, serving as a passage for ventilating air to the ventilation module 130 according to a control operation.

The compressed air stored in the compressed air tank 190 is transferred to the ventilation module 130 of the underwater vehicle through the pneumatic hose 180. Here, the compressed air discharged from the compressed air tank 190 may be transferred to the pneumatic hose 180 through a regulator (not shown) and a flow rate regulator (not shown) so that the compressed air may maintain a constant pneumatic pressure.

The controller 150 may sense rise of the cavity tail portion when a super-cavity is generated. In addition, the controller 150 controls an overall operation related to ventilating of the compressed air through the ventilation module 130. Specifically, in order to generate a vertically upward lift at the cavity tail portion, the controller 150 controls ventilating and a ventilation amount of the compressed air so that the compressed air stored in the compressed air tank 190 may be ventilated through the ventilation module 130 to generate a vertical upward lift at the cavity tail portion.

The controller 150 may be realized as a control system (computer) installed in the underwater vehicle having the cavity generating unit 110 and the ventilation module 130. In addition, the controller 150 may be referred to as a control device hereinafter.

Further, in an embodiment, the controller 150 may calculate a numerical value of a lift to be generated at the cavity tail portion to control the posture according to the degree of rise of the cavity tail portion. To this end, the controller 150 may sense a size, position, and area of the water-contact portion of the super-cavity underwater vehicle as the cavity tail portion rises. Also, the controller 150 may determine and control a ventilation position and a ventilation rate of the compressed air at the ventilation module 130 based on the calculated numerical value of the lift.

Figure 3:
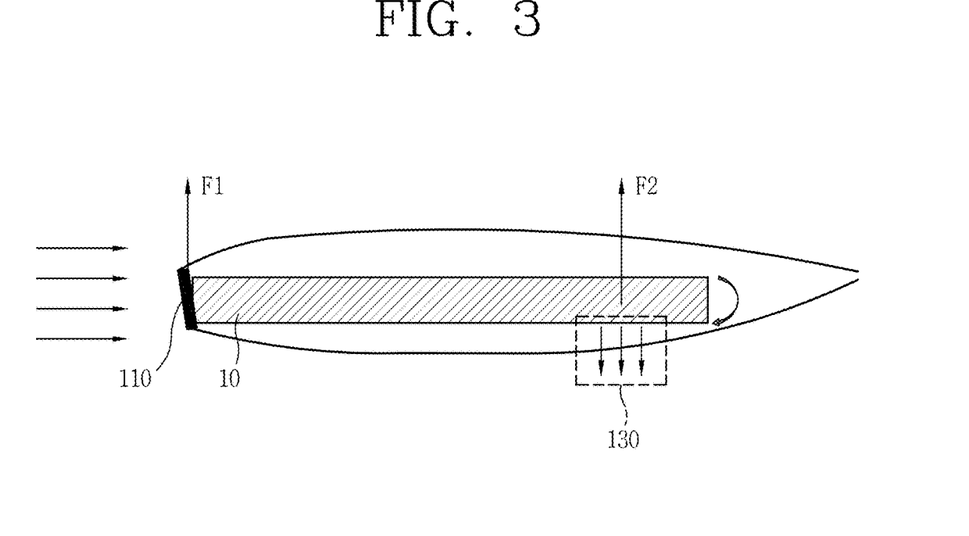
FIG. 3 is a view illustrating a state in which a cavity buoyancy effect is suppressed by ventilating compressed air vertically downwards and a state in which a vertically upward lift is generated to control a posture of a tail portion of an underwater vehicle according to an operation of a cavitator system according to an embodiment of the present disclosure.
Figure 4:
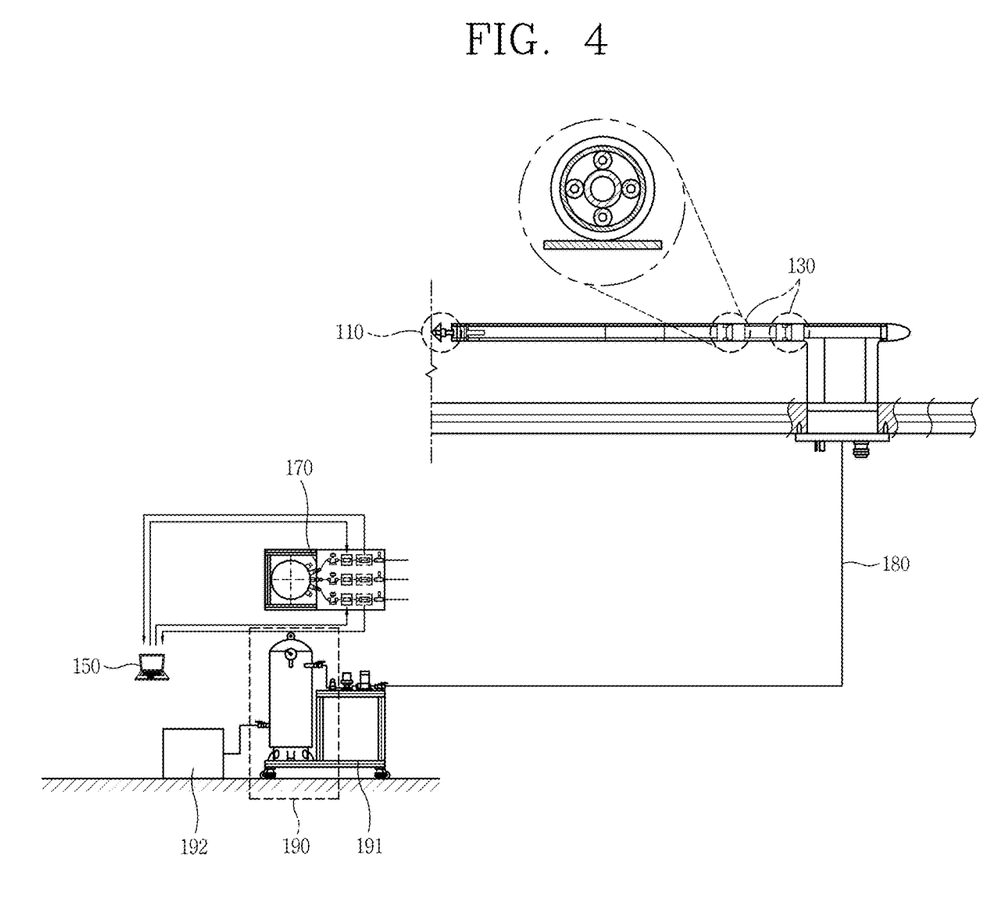
FIG. 4 is a diagram illustrating a design of a cavitator system according to an embodiment of the present disclosure.

Hereinafter, a method of suppressing a cavity buoyancy effect by ventilating compressed air vertically downwards according to an operation of a cavitator system according to an embodiment of the present disclosure will be described in detail with reference to FIGS. 3 and 4. FIG. 3 is a view illustrating a state in which a cavity buoyancy effect is suppressed by ventilating compressed air vertically downwards and a state in which a vertically upward lift is generated to control a posture of a tail portion of an underwater vehicle according to an operation of a cavitator system according to an embodiment of the present disclosure. FIG. 4 is a diagram illustrating a design of a cavitator system according to an embodiment of the present disclosure.

First, FIG. 4 is a view illustrating a design of a cavitator system, for example, to experiment cavity generation in a high-speed cavitation tunnel. As illustrated in FIG. 4, the underwater vehicle 10 in which the cavity generating unit 110, e.g., a cavitator, is installed at the front portion and the plurality of ventilation modules 130 are provided at the tail portion may be connected to the compressed air tank 190 through the pneumatic hose 180.

When a super-cavity of the underwater vehicle is generated, the control device 150 may sense rise of the cavity tail portion through monitoring. Alternatively, when a water-contact portion is detected in the super-cavity underwater vehicle or a change of a posture thereof is sensed, a control signal may be transferred to the control device 150 to generate a lift in the cavity tail portion. To this end, the cavitator system 100 according to the present disclosure may include a sensor (not shown) for sensing rise of the cavity tail portion and/or a sensor for sensing a change in posture of the underwater vehicle, e.g., a geomagnetism sensor, an acceleration sensor, and the like.

In addition, the control device 150 may directly receive or automatically calculate the amount and rate of the compressed air to be ventilated to the ventilation module 130.

Thereafter, under the control of the control device 150, compressed air is discharged from the compressed air tank 190 in which air compressed through an air compressor 192 is stored. The compressed air discharged from the compressed air tank 190 is transferred to the pneumatic hose 180 through the regulator 170 and a flow rate adjusting unit 191 so that a constant pneumatic pressure may be maintained. Here, the flow rate adjusting unit 191 may calculate a difference between an output flow rate and an input flow rate measured by a flowmeter installed at a lower end and feedback-control a flow rate adjusting valve inside the flow rate adjusting unit such that the output flow rate is equal to the input flow rate.

The compressed air discharged from the compressed air tank 190 is transferred to the underwater vehicle through the pneumatic hose 180 and is ventilated through the rear ventilation module 130.

Referring to FIG. 3, a lift F1 is generated at the front portion of the cavity as the underwater vehicle is completely covered with the cavity. Then, as described above with reference to FIG. 1, the other remaining portion of the body of the underwater vehicle except for the cavity generating unit 110, i.e., the cavitator, loses buoyancy to lose a force supporting the body, which makes it difficult to maintain the posture. 4. Thus, according to the design described above with reference to FIG. 4, air is ventilated vertically downwards through the ventilation module 130 located at the tail portion of the underwater vehicle according to the ventilation operation of the compressed air by the control device 150. Here, the amount and rate of the compressed air to be ventilated from the ventilation module 130 are calculated and adjusted in advance by the control device 150.

When the compressed air is ventilated through the ventilation module 130 as described above, a vertical upward force F2 is generated at the cavity tail portion based on the principle of action/reaction, and the tail portion of the underwater vehicle 10 is supported by the lift to maintain the posture.

Therefore, in order to implement the present disclosure, a force required for supporting the tail portion of the underwater vehicle 10, i.e., a lift F2, must be calculated in advance through the control device 150. Also, the control device 150 may determine a position of the ventilation module 130, the position and number of ventilation holes for ventilating compressed air inside the ventilation module 130, and the amount and rate of the compressed air to be ventilated on the basis of the calculated lift, and control a ventilating operation in the ventilation module 130.

When the compressed air is ventilated vertically downwards through the ventilation module 130 of the underwater vehicle 10 through this process, buoyancy of the tail portion (of the cavity which has risen as illustrated in FIG. 3 is removed, and accordingly, the water-contact portion (i.e., the portion exposed to water) of the underwater vehicle is removed and the super-cavity underwater vehicle may be stably controlled in posture and travel.

Meanwhile, even after the compressed air is ventilated, the control device 150 may keep monitoring a state of the underwater vehicle according to ventilation of compressed air. In case where the super-cavity underwater vehicle needs to be adjusted in posture as a result of monitoring, specifically, in case where a lift needs to be generated again at the cavity tail portion, the control device 150 may determine whether to additionally ventilation compressed air.

Also, in an embodiment, 4, the plurality of ventilation modules 130 may be provided, and each of the plurality of ventilation modules 130 may be configured as a hole type, a slit type, or a combination of a hole and a slit.

In FIG. 4, with respect to a position where the cavity generating unit 110 was installed, a first ventilation module was installed at position spaced apart by about 500 mm from the position of the cavity generating unit 110, and a second ventilation module was installed to be spaced apart by about 100 mm from the first ventilation module. That is, the rear ventilation positions for controlling the cavity configuration were away from the cavitator by 500 mm and 600 mm, respectively. Also, in FIG. 4, as the cavity generating unit 110, i.e., the cavitator, a disk type cavitator having a diameter of 30 mm was used and a flow velocity of a tunnel testing unit was limited to 10 m/s. Also, a ventilation amount of compressed air was adjusted within a range of 20 to 150 LPM.

Ventilating and a ventilation rate of the first ventilation module and the second ventilation module illustrated in FIG. 4 are each controlled through the control device 150. For example, air may be ventilated only to the first ventilation module or to the second ventilation module. Alternatively, the amount and rate of the compressed air ventilated to the first ventilation module and the second ventilation module may be different from each other.

Figure 5A:
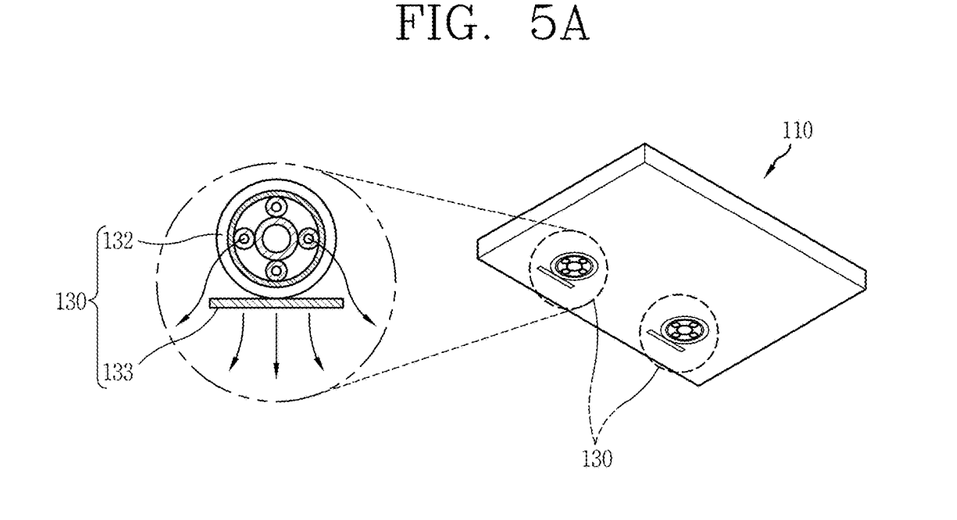
FIGS. 5A and 5B are detailed views of a ventilation module for ventilating compressed air in a cavitator system according to the embodiment of the present disclosure.
Figure 5B:
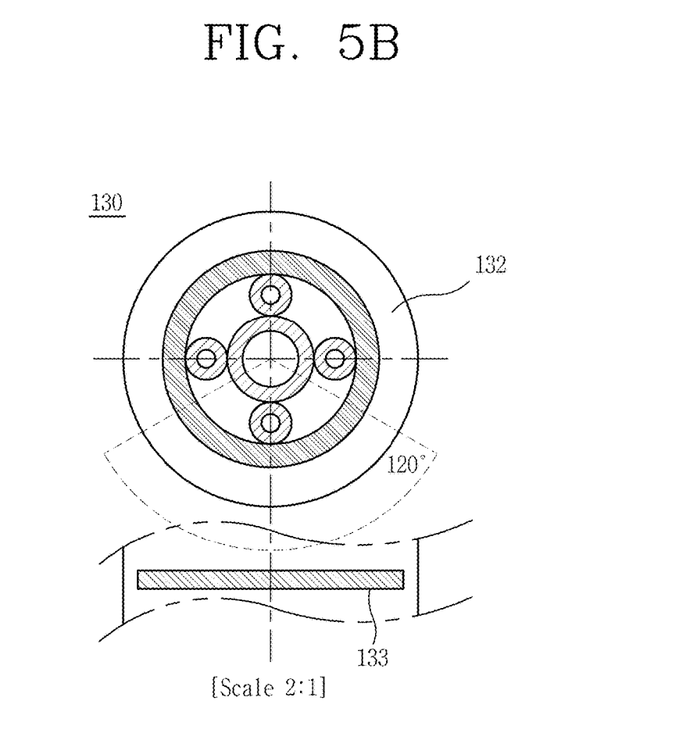

FIGS. 5A and 5B illustrate a ventilation module for ventilating compressed air in more detail. Specifically, FIGS. 5A and 5B are detailed views of a ventilation module for ventilating compressed air in the cavitator system according to an embodiment of the present disclosure. As illustrated in FIGS. 5A and 5B, the ventilation module 130 formed on a lower surface of the tail portion of the underwater vehicle 10 may be divided into a hole ventilation port 132 and a slit ventilation port 133. That is, the ventilation module 130 may include a plurality of hole ventilation ports 132 and at least one slit ventilation port 133.

In the case of the hole ventilation port 132, each two holes may be added at intervals of 15 degrees with respect to one hole located at the vertically downward center of the underwater vehicle 10, whereby the hole ventilation port 132 may have a total of five holes. Here, a diameter of each hole may be about 2 mm.

In the case of the slit ventilation port 133, a rectangular slit is provided at 60 degrees to the left and right about a vertical lower portion of the underwater vehicle 10 to extend at an angle of 120 degrees. Here, a width of the slit may be about 1 mm.

In this manner, the hole ventilation port 132 having the five holes may be arranged in a radial shape with respect to one concentric hole, that is, four holes surround an outer circumferential surface of the center hole. At least one slit ventilation port 133 may be disposed at the periphery of the hole ventilation port 132, for example, on the upper side, lower side (FIGS. 5 and 6), the right and left sides, or at least one of them. As illustrated in FIG. 5, a plurality of (e.g., two) ventilation modules having such a structure may be arranged at a predetermined distance.

Also, in an embodiment, the hole ventilation port 132 and the slit ventilation port 133 of the ventilation module 130 may be formed to protrude downwards. Alternatively, a separate casing may be additionally formed in the ventilation module 130 so that the hole ventilation port 132 and the slit ventilation port 133 may be formed integrally with the casing and formed on a lower surface of the casing in a penetrating manner.

Even in case where the ventilation module 130 includes the hole ventilation port 132 and the slit ventilation port 133, the control device may separately perform control to ventilation compressed air only through the hole ventilation port 132 or only through the slit ventilation port 133.

Figure 6:
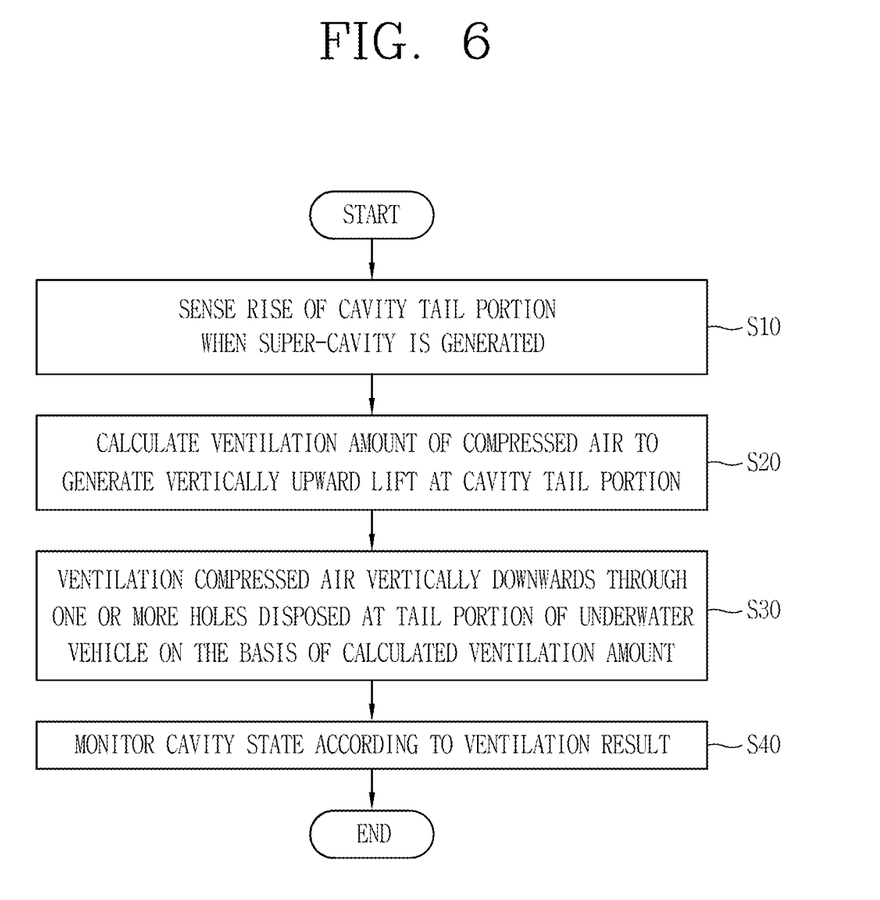
FIG. 6 is a flowchart illustrating an operation method of a cavitator system according to an embodiment of the present disclosure.

FIG. 6 is a flowchart illustrating an operation method of a cavitator system according to an embodiment of the present disclosure. In this regard, the operation method of the cavitator system and the contents described in the cavitator system described above may be used in combination.

First, rise of the cavity tail portion of the underwater vehicle is sensed when a super-cavity is generated in the underwater vehicle (S10). To this end, the underwater vehicle may include a sensor (not shown) for sensing the degree of tilting of the front and tail portions of the cavity or for sensing a water-contact portion of the underwater vehicle when the super-cavity is generated in the underwater vehicle.

Then, the control device calculates a ventilation amount of compressed air for generating a vertical upward lift at the tail portion (S20). Compressed air is ventilated vertically downwards through at least one hole arranged at the tail portion of the underwater vehicle on the basis of the calculated ventilation amount (S30). A state of the cavity tail portion according to the ventilation result is then monitored (S40).

Further, in an embodiment, the control device may determine, according to the monitoring, whether to additionally ventilation compressed air to adjust the posture of the super-cavity underwater vehicle.

Figure 7:
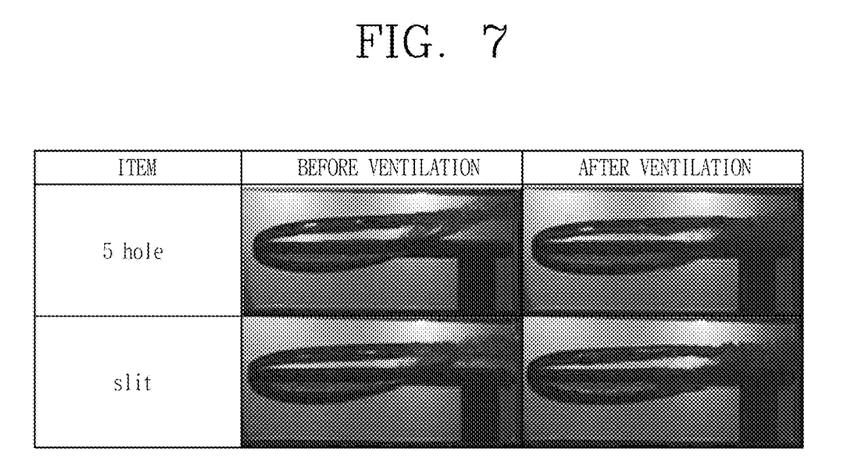
FIG. 7 illustrates images of a change in a cavity shape according to application of a hole ventilation port and a slit ventilation port in experiment, captured using a high-speed camera, in a cavitator system according to an embodiment of the present disclosure.
Figure 8:
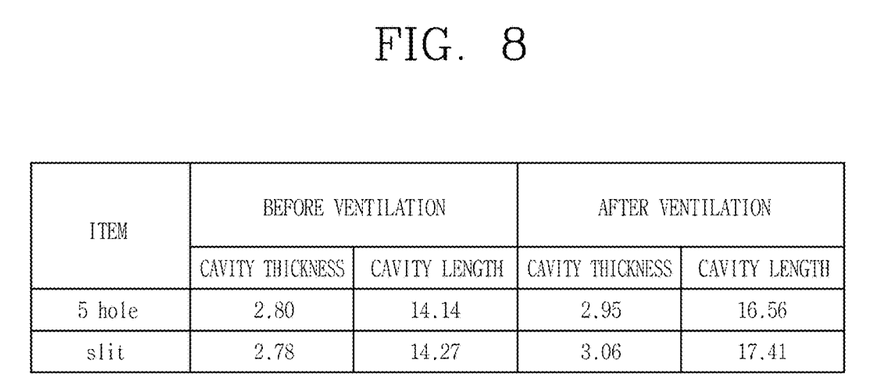
FIG. 8 is a table illustrating changes in cavity size according to the results of the experiment of FIG. 7.

FIG. 7 illustrates images of a change in a cavity shape according to application of a hole ventilation port and a slit ventilation port in experiment, captured using a high-speed camera, in a cavitator system according to an embodiment of the present disclosure. FIG. 8 is a table illustrating changes in cavity size according to the results of the experiment of FIG. 7. Specifically, FIG. 8 illustrates a comparison between effects of the case where compressed air is ventilated through the hole ventilation port and the case where compressed air is ventilated through the slit ventilation port.

In the case of the hole ventilation port having five holes, the thickness of the cavity increased by about 5%, and in the case of the slit ventilation nozzle, it increased by about 10%. Also, in the case of the hole ventilation port having five holes, the length of the cavity increased by 17%, and in the case of the slit ventilation port, it increased by 22%. That is, according to the result of testing of the operations of the hole ventilation port and the slit ventilation port, the slit type ventilation method was more effective.

As described above, according to the cavitator system for suppressing a cavity buoyancy effect and the control method thereof according to the embodiment of the present disclosure, rise due to the buoyancy effect of the cavity is suppressed and the thickness and length of the cavity are improved, thereby reducing or removing the asymmetrical force acting on the super-cavity underwater vehicle, whereby the posture of the super-cavity underwater vehicle may be stably controlled. Accordingly, the super-cavity underwater vehicle may stably travel. In addition, by ventilating air vertically downwards from the tail portion of an underwater vehicle, the posture of the tail portion of the underwater vehicle may be controlled without an additional device such as a control fin or thrust vector control in a super-cavity state using a vertically upward lift generated according to the principle of action/reaction.

Further, embodiments of the present disclosure have been described, but the scope of the present disclosure is not limited to the specific embodiments set forth herein and may be variously modified and improved within the scope of the appended claims of the present disclosure. Further, the method according to the present disclosure described herein may be implemented in software, hardware, or a combination thereof. For example, the method in accordance with the present disclosure may be stored in a storage medium (e.g., a memory, a flash memory, a hard disk, etc., inside a terminal) and may be implemented codes or commands included in a software program which may be executed by a processor (e.g., a microprocessor inside a terminal).

What is claimed is:

1. A cavitator system for suppressing a cavity buoyancy effect, the cavitator system comprising:
    a cavity generating unit disposed at a front portion of an underwater vehicle and generating super-cavity;
    a pneumatic hose transferring compressed air stored in a compressed air tank to the underwater vehicle;
    a ventilation module positioned at a tail portion of the underwater vehicle and including at least one hole ventilating compressed air transferred through the pneumatic hose vertically downwards; and
    a controller sensing rise of a cavity tail portion and a change in posture of the underwater vehicle when a super-cavity is generated and ventilating compressed air through the ventilation module such that a vertically downward lift is generated at the cavity tail portion.

2. The cavitator system of claim 1, wherein
the controller monitors a state of the cavity tail portion according to, and determines whether to additionally ventilate compressed air ventilation compressed air to adjust a posture of the super-cavity underwater vehicle.

3. The cavitator system of claim 1, wherein
the ventilation module includes:
a first ventilation module disposed at a position spaced apart from the cavity generating unit by a predetermined distance; and
a second ventilation module spaced apart from the first ventilation module by a predetermined distance.

4. The cavitator system of claim 3, wherein
the controller separately controls ventilating and a ventilation rate of the first ventilation module and the second ventilation module according to the amount of compressed air to be ventilated.

5. The cavitator system of claim 1, wherein
the controller calculates a numerical value of a lift to be generated at the cavity tail portion according to the degree of rise of the cavity tail portion, and determines a ventilation position and a ventilation rate at the ventilation module on the basis of the calculated numerical value of the lift.

6. The cavitator system of claim 1, wherein
the ventilation module includes a plurality of hole ventilation ports and one or more slit type ventilation ports.

7. The cavitator system of claim 6, wherein
in the ventilation module, the plurality of hole ventilation ports have a structure in which the other remaining hole ventilation ports are radially disposed centered on one hole ventilation port, and one or more slit type ventilation ports are disposed on the periphery of the hole ventilation ports.

8. An operation method of a cavitator system, the operation method comprising:
    sensing rise of a cavity tail portion when a super-cavity is generated in an underwater vehicle;
    calculating a ventilation amount of compressed air for generating a vertically upward lift at the cavity tail portion;
    ventilating compressed air vertically downwards through one or more holes disposed at a tail portion of the underwater vehicle on the basis of the calculated ventilation amount; and
    monitoring a state of the cavity tail portion according to the ventilation result.

9. The operation method of claim 8, further comprising:
determining whether to additionally ventilation compressed air to adjust a is posture of the super-cavity underwater vehicle according to the monitoring.

* * * * *